3,175,932
FLUX COMPOSITION
Joseph S. Brady, Morristown, N.J., assignor to Air Reduction Company, Incorporated, New York, N.Y., a corporation of New York
No Drawing. Continuation of application Ser. No. 59,472, Sept. 30, 1960. This application Mar. 25, 1963, Ser. No. 267,804
3 Claims. (Cl. 148—23)

This application is a continuation of my application Serial No. 59,472, filed September 30, 1960, now abandoned, for Flux Composition.

This invention relates to fluxes for use in connection with hard soldering and brazing, and more particularly to such fluxes of the alkali-metal:fluoride:borate variety such as has been classified by the American Welding Society as flux type No. 3.

In the use of such fluxes the usual rapid heating of the work, after the application to its surface of a film of the flux, tends to cause the flux to spit and spatter away—an action which is disadvantageous both by reason of the resulting loss of flux from the surface and by reason of the attendant contamination of nearby objects. It is therefore desirable that the flux contain an added constituent, or binder, acting to cause it better to adhere to the surface of the work despite the heating of the latter, and it is an object of my invention to provide an additive which will constitute such a binder.

A general problem encountered with such fluxes is the tendency of the molecules of the flux not to become, or during prolonged storage not to remain, thoroughly dispersed. A failure or deterioration of such dispersal may manifest itself as a lack of smooth texture of the flux, as a separation of water from the remainder of the flux, as a drying out of the flux by evaporation, as a crystallization of the elements of the flux, or as a combination of two or three or all of these conditions or actions. It is highly desirable that the flux contain an added constituent, or dispersing agent, aiding in the original accomplishment and in the maintenance of good dispersion—thus providing sustained smooth texture, and minimizing or altogether precluding separation of water, drying out, and crystallization—and it is an object of my invention to provide an additive which will constitute such a dispersing agent.

It is an object of my invention to provide a single additive which will simultaneously act as such a binder and as such a dispersing agent as have been described above.

In the use of flux additives there is serious danger that the additive or additives, in burning away upon the heating of the work and flux, will leave on the surface of the work a substantial carbon build-up. This may be of sufficient magnitude actually to interfere with good soldering or brazing; even when not of that magnitude, however, such a carbon build-up is very undesirable, for the attendant discoloration of the work surface is not merely aesthetically displeasing but also constitutes an actual psychological hazard which may seriously interfere with the apt performance of the required soldering or brazing operation. It is an object of my invention to provide an additive, acting as a binder or dispersing agent or both, which will burn away with little or no carbon build-up.

It is a specific object of my invention to provide a single adddtive which simultaneously acts as such a binder and as such a dispersing agent as have been described above, and which will burn away with little or no carbon build-up.

According to my invention the above-stated objects are achieved by including, as an additive to the alkali-metal:fluoride:borate flux, a suitable amount of polyethylene glycol of suitable molecular weight, as hereinafter more fully described.

Other and allied objects and accomplishments of the invention will appear from the following description and the appended claims.

A purely illustrative flux with which my invention may be very usefully employed has a basic composition—i.e., considered without its water vehicle or any wetting agent, and without the additive according to my invention—as follows:

| | Parts by weight |
|---|---|
| Potassium fluoroborate | 110 |
| Potassium tetra-borate | 120 |
| Potassium bi-fluoride | 60 |
| Boric acid | 100 |

The normal manner of preparing this flux is to combine these materials, together with a suitable quantity of water (for example, 110 parts by weight) and preferably also a suitable quantity of a wetting agent (for example, 1 part by weight of such a wetting agent as is mentioned below), and to process the combination through a suitable colloid mill. The result is a typical alkali-metal:fluoride:borate flux, useful but characterized in substantial measure by the disadvantages and problems discussed in the second and third paragraphs of this specification.

I have found that if to this basic composition there be added a polyethylene glycol of suitable average molecular weight in suitable quantity, and the water and preferably a wetting agent be used in reasonable respective amounts, there results a flux achieving all the objects of my invention stated above.

A polyethylene glycol (of which commercially available examples are products of Union Carbide and Carbon Corporation which, in the higher average molecular weights, are designated by the trademark term "Carbowax" followed by a number roughly expressing that weight) which I find generally useful for the purposes of my invention is one which is solid at or near ordinary room temperature, and thus possesses an average molecular weight of the minimum order of 600; there appears to be no especial limitation on the maximum permissible average molecular weight, at least up to the order of the approximate 7,000 maximum heretofore readily available. For at least some if not all of the purposes of the present invention, however, it appears preferable to use a polyethylene glycol of an average molecular weight of a minimum order of 1,500—the matter of preferred molecular weight being further discussed below. Very desirably, according to my observations, there may be used a polyethylene glycol of average molecular weight of the order of 3,500 (such as the commercially available "Carbowax 4,000").

The quantity of the polyethylene glycol to be used may be considerably varied without seriously impairing the accomplishment of the objects of my invention, which remain in large measure achieved throughout as wide a range as from 1 part to 15 parts (by weight in the above example), or typically from 0.2% to 3% of the flux by weight. It is, however, of course true that as the quantity is reduced too far the beneficial results gradually attenuate; on the other hand as the quantity is increased too far there becomes gradually impaired the above-discussed freedom from residual carbon build-up. I have found it preferable to choose the quantity in the range from approximately 2 parts to 5 parts (by weight in the above example), or typically from 0.4% to 1% of the flux by weight—and very desirable, with the particular basic composition set forth in the above example, to place it at approximately 3 parts, or typically at approximately 0.6% of the flux, by weight.

The amount of water to be used is to some extent dependent on the consistency thought desirable in the finished flux, which it is most usually desired to have in the form of a super-saturated paste. Typically it may be in the range from 75 parts to 130 parts (by weight in the above example), or from 16% to 25% of the flux by weight—very desirably 105 parts, or approximately 21% of the flux, by weight.

From what has been said above it follows that a typical flux composition embodying my invention to excellent advantage is as follows:

| | Percent by weight |
|---|---|
| Potassium fluoborate | 22.0 |
| Potassium tetra-borate | 24.0 |
| Potassium bi-fluoride | 12.0 |
| Boric acid | 20.0 |
| Polyethylene glycol of average molecular weight, apx. 3,500 | 0.6 |
| Wetting agent | 0.2 |
| Water | 21.2 |
| | 100.0 |

A wetting agent specifically useful in such a flux composition (and in those hereinafter set forth) in the specified proportionate amount is iso-octyl phenoxy polyethoxy ethanol (of which a commercially available example is a product of Rohm & Haas Company known as "Triton X–100"), or the nonionic liquid iso-octyl phenoxy polyoxyethylene ethanol (of which a commercially available example is a product of Antara Chemicals (Division, General Aniline & Film Corporation) known as "Igepal CA–710"). These and other wetting agents being known as ingredients of fluxes of the type herein dealt with, they have no peculiar relationship to the instant invention—beyond the fact that neither of them, in the specified quantity, will noticeably impair the freedom of the flux from residual carbon build-up, whereas an improvidently chosen wetting agent might indeed impair that freedom.

It is to be understood that the basic composition of the alkali-metal:fluoride:borate flux with which my invention may be employed to perform its several beneficial functions may be varied within wide limits. By way of wholly nonlimitative example of such variation, I set forth below as Alternative I a formula from which there is absent the potassium fluo-borate ingredient, and as Alternative II a formula from which there is absent the potassium tetra-borate ingredient, but in each of which the polyethylene glycol additive is used in accordance with my invention, again to accomplish all its above-stated objects:

*Alternative I*

| | Percent by weight |
|---|---|
| Potassium tetra-borate | 20.0 |
| Potassium bi-fluoride | 34.0 |
| Boric acid | 27.0 |
| Polyethylene glycol of average molecular weight, apx. 3,500 | 0.5 |
| Wetting agent | 0.15 |
| Water | 18.35 |
| | 100.00 |

*Alternative II*

| | Percent by weight |
|---|---|
| Potassium fluoborate | 20.0 |
| Potassium bi-fluoride | 28.0 |
| Boric acid | 35.0 |
| Polyethylene glycol of average molecular weight, apx. 3,500 | 0.45 |
| Wetting agent | 0.15 |
| Water | 16.4 |
| | 100.00 |

In these last two formulae it will be noted that slightly but progressively lower percentages both of the water and of the polyethylene glycol are indicated—those of the water having been found advantageous with these formulae for the desired consistency of the flux. Those lower percentages of the polyethylene glycol, found thoroughly satisfactory in practice, are of course within the preferred limits (of between 0.4% and 1.0% of the flux by weight) set forth above; at the same time they exhibit a variation in an approximate proportion to the water content—the ratio of the polyethylene glycol to the water in each of the three formulae being approximately 1:35 by weight. Thus the quantity of polyethylene glycol may be alternatively stated as preferably in the range of approximately $\frac{1}{50}$ to $\frac{1}{20}$ (by weight) of the quantity of water, and very desirably as of the order of $\frac{1}{35}$ of that quantity.

An alkali-metal:fluoride:borate flux made according to any of the three formulae disclosed above, or otherwise in accordance with the above teachings, exhibits excellent adherence to the surface of the work despite the heating of the latter; excellent dispersion, which manifests itself in smooth texture of the flux, absence of separation of water, and absence of crystallization; and excellent maintenance of dispersion, which manifests itself in maintenance of the above properties, in absence of drying out of the flux by evaporation, and in generally improved storability over protracted periods of time.

While I do not profess to know in detail the entire physical action by reason of which the addition of the polyethylene glycol accomplishes the desirable results abovementioned, I believe that in at least large measure the beneficial action is fundamentally the introduction into the flux—which is essentially a super-saturated paste—of a number of very large molecules. These, being interspersed (in the original preparation in the colloid mill or in some equivalent manner) between the much smaller molecules of the other ingredients, interfere generally with groupings of those other molecules.

Since segregation of any ingredient of the flux from the remainder inherently involves groupings of the molecules of that ingredient, the interference with grouping inhibits segregation of ingredients generally—and thus inhibits the undesirable segregation of ingredients which must occur in spitting or spattering of the flux on heating; the undesirable segregation of water from the remainder of the flux, whether without or with evaporation of that water; and the undesirable minute segregation of ingredients of which poor texture is a manifestation. Further, since crystallization inherently involves the grouping of molecules of the water with those of other of the ingredients, the interference with grouping inhibits that highly undesirable effect.

In bringing about these inhibiting actions, and particularly the latter, I believe the phenomenon which is termed "steric hindrance" plays at least a substantial part.

What has been said in the last three paragraphs also explains the more profound basis of my preference—which from a pragmatic point of view rests on experimental observation—for the polyethylene glycols of relatively higher average molecular weights. This is over and above a less profound, but still worthwhile, basis for that preference which basis resides in their easier handleability in milling, resulting from their greater hardness.

Of course, in order properly to accomplish its beneficial action the ingredient of large molecular weight must be in at least substantial degree water-soluble; this the polyethylene glycols are—the solubility in water of polyethylene glycol of average molecular weight 600 being substantially complete, and the solubilities of those of progressively higher molecular weights decreasing only slowly and still remaining approximately 50% for one of average molecular weight approximately 7,000. Further, in order not to leave a substantial residual carbon build-up the ingredient of large molecular weight must, under the intense heating involved in the soldering or brazing, break down principally into a gas which burns "clean"; this the polyethylene glycols, breaking down principally into polyethylene gas, do in excellent degree—and a very large number indeed of other additives, many of which might otherwise serve reasonably well, do not.

The above examples are not intended as a restriction of the invention, of which the spirit and scope I undertake to define in the appended claims.

I claim:

1. A flux composition consisting essentially of about 22% by weight of potassium fluoroborate, about 24% by weight of potassium tetra-borate, about 12% by weight of potassium bi-fluoride, about 20% by weight of boric acid, about 0.2% to about 3% by weight of a polyethylene glycol of an average molecular weight of about 600 to about 7000, about 0.2% by weight of a wetting agent, and about 16% to about 25% by weight of water.

2. A flux composition consisting essentially of about 20% by weight of potassium tetra-borate, about 34% potassium bi-fluoride, about 27% by weight of boric acid, about 0.2% to about 3% by weight of a polyethylene glycol of an average molecular weight from about 600 to about 7000, about 0.15% by weight of a wetting agent, and about 16% to about 25% by weight of water.

3. A flux composition consisting essentially of about 20% by weight of potassium fluoroborate, about 28% by weight of potassium bi-fluoride, about 35% by weight of boric acid, about 0.2% to about 3% by weight of a polyethylene glycol of an average molecular weight of about 600 to about 7000, about 0.15% by weight of a wetting agent, and about 16% to about 25% by weight of water.

References Cited by the Examiner
UNITED STATES PATENTS

| | | | |
|---|---|---|---|
| 2,493,372 | 1/50 | Williams | 148—24 |
| 2,547,771 | 4/51 | Pessel | 148—23 |
| 2,631,952 | 3/53 | Williams | 148—25 |
| 3,006,790 | 10/61 | Ewing | 148—23 |

OTHER REFERENCES

Merck Index, 7th ed. Merck and Co., Inc., 1960, pages 213–214 and 832.

DAVID L. RECK, *Primary Examiner.*

WINSTON A. DOUGLAS, *Examiner.*